Jan. 28, 1936.  S. E. B. SODERBERG  2,029,203
TEMPERATURE REGULATOR
Filed July 28, 1932  3 Sheets-Sheet 1

Sten E. B. Söderberg
INVENTOR

BY O. V. Thiele
ATTORNEY

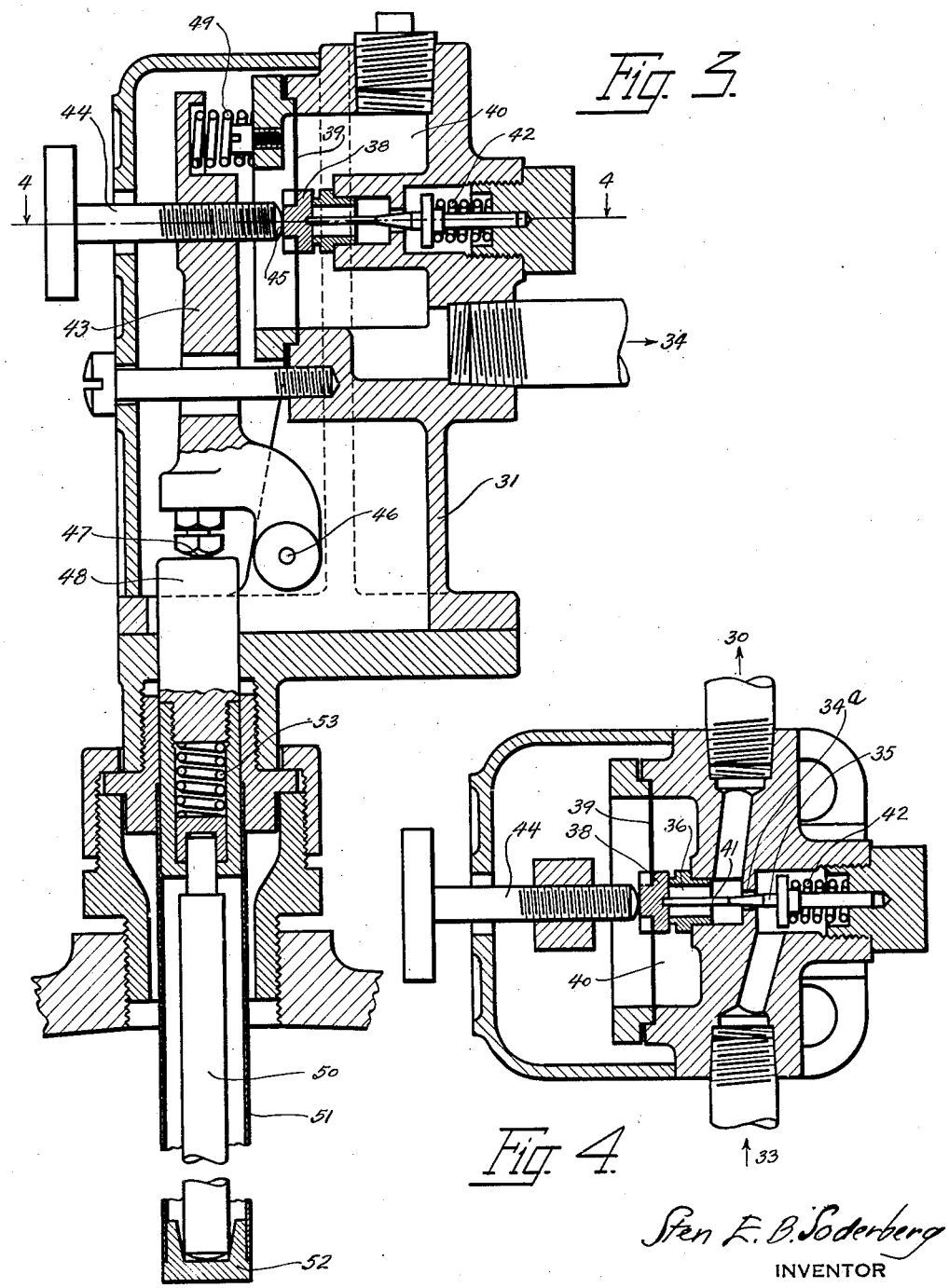

Patented Jan. 28, 1936

2,029,203

UNITED STATES PATENT OFFICE 2,029,203

TEMPERATURE REGULATOR

Sten E. B. Soderberg, Passaic, N. J., assignor to Leslie Company, Lyndhurst, N. J.

Application July 28, 1932, Serial No. 625,309

8 Claims. (Cl. 236—80)

This invention relates primarily to apparatus employed for heating water or other liquids whose temperature it is desired to maintain within narrow predetermined limits. Some of the elements employed by me in this connection and illustrated and described herein have application, however, apart from the particular one in which they are herein used.

In describing my invention I shall for illustrative purposes speak of it as used in connection with apparatus for heating water, and doing this by means of steam; but I do not wish thereby to limit myself in this respect, and it will be clear that other fluids may be heated by such apparatus, and that the heating fluid may be a vapor other than the vapor of the liquid being heated, or may even be a non-condensible fluid.

The ordinary means for heating water in apparatus of this sort is steam, which may or may not mingle with the water. Usually this steam is led through a coil or a series of coils placed within the body of the water to be heated but not in communication with it. The inlet to such coil or coils is controlled by some form of valve which is made responsive by some thermostatic means to the temperature of the water in such a way that when the water has reached a certain temperature the steam is cut off and then when the temperature drops to some lower predetermined point the valve again opens. It is quite possible to regulate temperature in this way but arrangements employed heretofore for the purpose have inherent defects or limitations making it impossible to get the desired close and positive regulation of the temperature. In particular, the packed stem with which most such valves are provided, introduces friction which interferes with stable and accurate regulation. It is the purpose of the present invention to supply apparatus for the purpose referred to which will result in keeping the temperature very close to the desired point. More specifically, one of the leading purposes of the invention is to provide apparatus of this sort in which friction of moving parts is reduced to the greatest possible extent, in which the operating forces are greatly increased, and which for every temperature occurring in the water to be heated, the steam will be supplied at a definite corresponding pressure regardless of whether the steam pressure ahead of the regulating valve is constant or not.

Further and more detailed objects will appear as the description proceeds.

Figure 1:
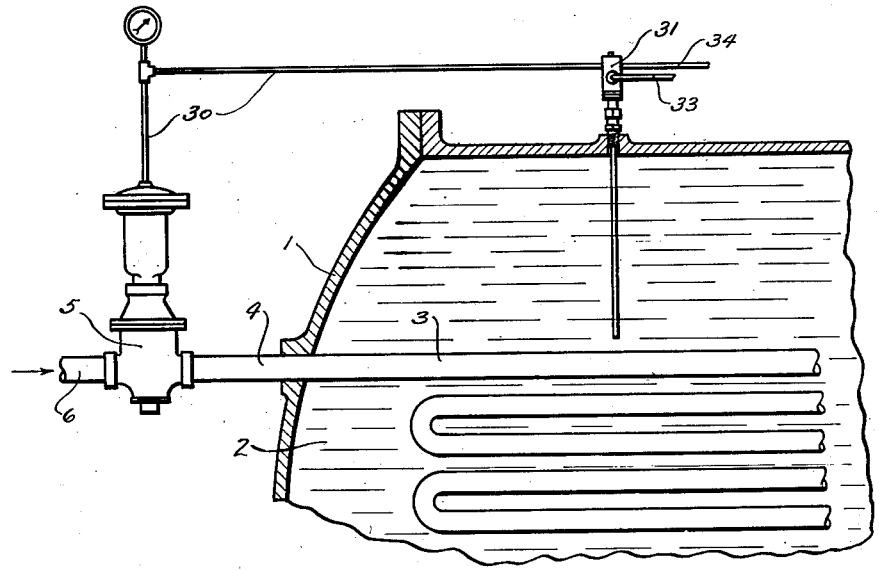
Figure 2:
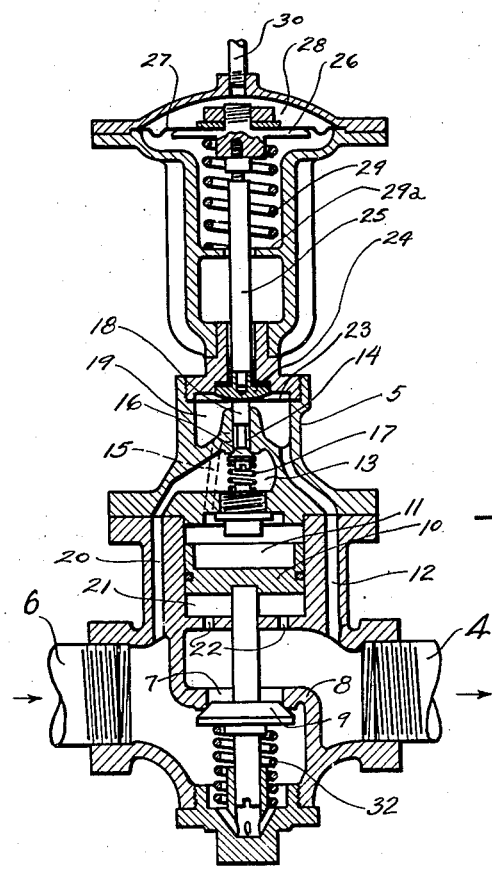
Figure 5:
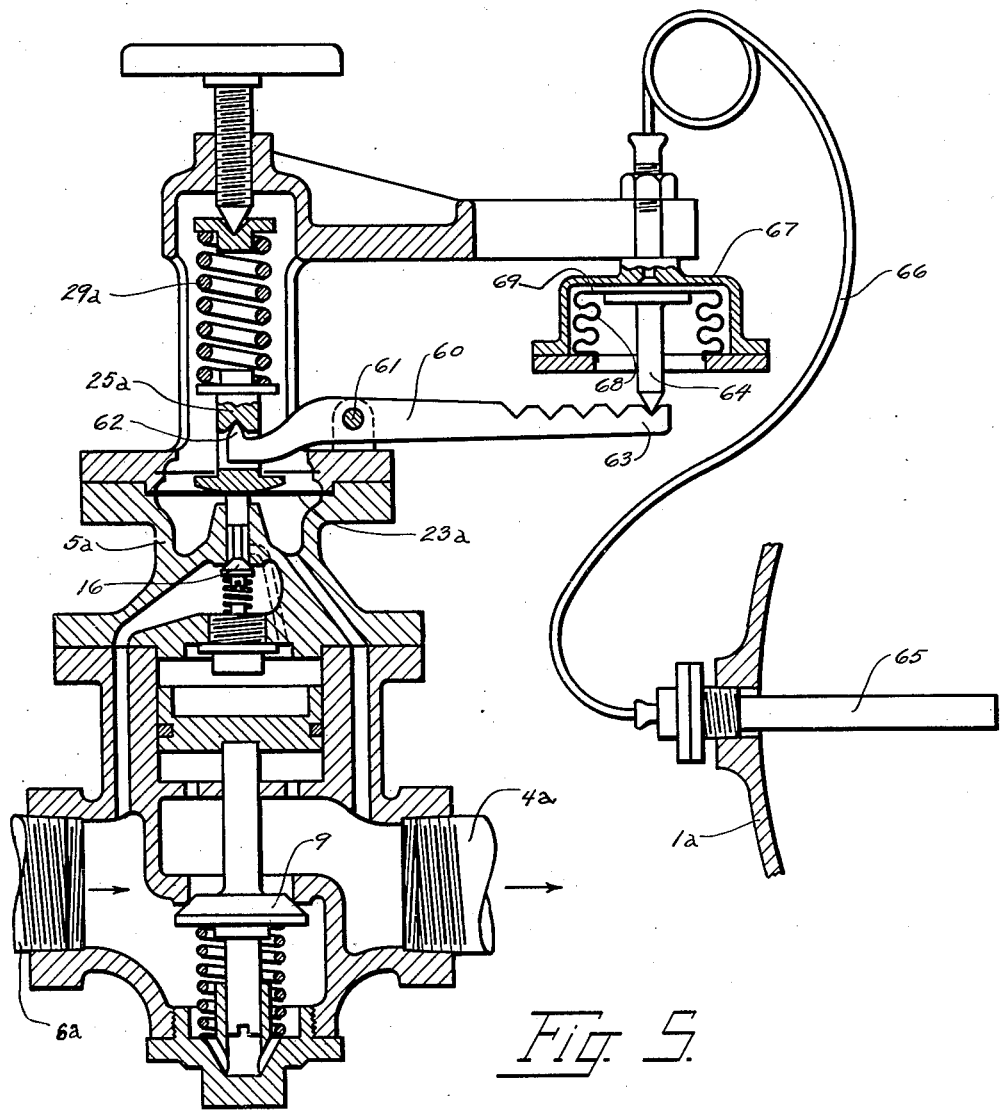

The invention is illustrated in the accompanying drawings in which Fig. 1 is a fragmentary view of a vessel containing liquid to be heated, with my invention applied. Fig. 2 is an enlarged vertical sectional view of a regulating valve employed in my invention. Fig. 3 is a view on a still larger scale of the thermostatic element and parts connected thereto which I employ. Fig. 4 is a section on line 4—4 of Fig. 3; and Fig. 5 is a vertical sectional view of a regulating valve and the co-operating elements of a modified form of the invention.

The vessel 1 of Fig. 1 contains a liquid such as water which is to be heated. A coil, portions of which appear at 3, is arranged in the liquid without opening into it, the inlet end 4 of such coil extending through the wall of the container 1. It will be understood that a suitable outlet (not shown) for the condensate forming within the coil 3 is provided. The coil is, in accordance with the usual practice, arranged so that the heating fluid is admtted at its upper end and the condensate will be withdrawn at the lower end. It will be understood that while I show a single coil 3, there may be a plurality of them arranged in parallel and perhaps connected to a common header or manifold both at the inlet and outlet. The inlet 4 is controlled by a valve generally designated by the numeral 5 and illustrated in detail in Fig. 2. Referring to Fig. 2, it will be noted that the valve resembles in a general way an ordinary and well-known form of reducing valve. The heating fluid which is generated and delivered to the reducing valve at high pressure, enters by means of the pipe 6, leaving the reducing valve for the coil by means of pipe 4. The port 7 in the partition 8 between the inlet and outlet is controlled by the valve 9. This valve is actuated by the piston 10 and is pressed resiliently upward toward its seat by spring 32. Operating fluid under pressure to actuate this piston is admitted to the chamber 11 above the piston 10 through the passage 15, port 14, chamber 13, and passage 20, the last-named passage being in open communication with inlet pipe 4. The port 14 is controlled by the pilot valve 16 which is pressed toward its seat by the spring 17. Steam that may leak past the guide 18 into the diaphragm chamber 19 will escape by means of passage 12 to the outlet side of the valve. The space 21 below piston 10 is in open communication with the outlet side of the valve by means of ports 22—22. The diaphragm 23 closing the upper side of the diaphragm chamber 19 has pressing against its upper side a member 24, upward from which there extends the rod 25 whose upper end is rigidly connected to the plate 26 bearing against the under side of diaphragm 27 closing the diaphragm chamber 28. The plate 26 is pressed upward by the spring 29 whose lower end engages the abutment 29a. A pipe connection 30 extends from the diaphragm chamber 28 to the thermostatic element generally designated by the reference numeral 31.

The function of this portion of the apparatus may be briefly stated as follows: The heating fluid enters pipe 6 at its higher pressure and passes through the port 7 being throttled down while doing so to a pressure depending upon the position of the valve 9. The position of the valve 9 is a result of the opposing upward resilient thrust of spring 32, the downward force exerted on the upper side of piston 10, and the pressures on the valve surfaces. The pressure in chamber 11 exerting the downward thrust in turn depends upon the opening of the pilot valve 16. The position of this valve is affected in the first place by the upward thrust of its spring 17 and in the second place upon the downward thrust exerted upon the upper side of the diaphragm 23 by the member 24. This member and its connected parts are forced in an upward direction by the spring 29 opposed to which is the downward pressure on diaphragm 27 of the pressure fluid within the chamber 28. The position of the valve 9 depends therefore among other things upon the pressure in the chamber 28.

Referring now to Figs. 3 and 4, the pipe 33 supplies a fluid under pressure to operate the mechanism employed in connection with the thermostat. This fluid may be air, or water, or some other fluid under pressure, and the pressure should preferably be substantially constant. A portion of the pressure fluid supplied escapes through the waste pipe 34, the rest of it flowing through pipe 30 to the diaphragm chamber 28 of the regulator of Fig. 2. The passage from the pipe 33 to pipe 30 includes a port 34a into which extends a tapered restriction pin 35. From a point beyond the port 34a branches off a passage 36 leading to chamber 40 and the waste pipe 34. The overflow port between passage 36 and chamber 40 is controlled by a disk 38 carried on the diaphragm 39. Pin 41, forming an extension of the restricting tapered pin 35, is kept in engagement with disk 38 by spring 42 which urges the restriction tapered pin 35 toward its port 34a and urges the disk 38 away from its seat on the end of passage 36. It will be evident that with the inlet fluid entering pipe 33 at substantially constant pressure, the pressure at the outlet 30 will vary with the position of the restricting tapered pin 35 and the disk valve 38. This pressure drop occurs very promptly since, as mentioned above, in addition to the main regulation by the relief of the pressure by the disk valve, the inlet is also restricted by the restricting pin. Heretofore in mechanism of this general type only one of two regulating means was used, either a permanently restricted supply and a regulable discharge or a regulable supply and a permanently restricted discharge. By employing both of the means described and shown I obtain a very much prompter and more sensitive regulation. This is true not only as far as lowering the pressure in pipe 30 is concerned when the valve and restriction pin move in the direction just described, but also with respect to a prompt raising of the pressure in this pipe when the valve and restriction pin move in the opposite direction. Further reference will be made to this point below. The spring 42 resiliently urges the restriction pin 35 and the disk valve 38 toward the left as viewed in the figure but their actual position is determined by the action of the arm 43. This arm carries an adjustable screw 44 whose rounded end 45 bears directly on the outer side of the disk valve 38, that is, the side on the outer side of the diaphragm 39. This arm or lever 43 is pivoted at 46. An adjustable abutment 47 is resiliently kept in contact with the upper end of member 48 of the thermostat proper by the spring 49. The member 48 spoken of is carried by the rod 50 of the thermostat. This thermostat is shown of a usual construction. The rod 50 is arranged inside of the tubular member 51. The tubular member 51 is of material such as brass having a large coefficient of thermal expansion, whereas the rod 50 is made of material having a very low coefficient of expansion or perhaps one of material having a zero coefficient of expansion, such as invar. The upper end of the tubular member 51 is secured rigidly relatively to the casing and the lower end of the rod 50 is kept in contact with the closure member 52 of the member 51 by means of a spring 53 interposed between the upper end of rod 50 and member 48. As the temperature to which the two members 50 and 51 are subjected fluctuates, these members experience a variation in their relative length, and their upper ends will move relatively to each other. The upper end of 30 the tube being rigidly secured, the free end of the rod and member 48 will move relatively to the casing. This motion will be transmitted by the lever 43 to the disk valve 38 and the tapered restriction pin 35. The varying temperatures affecting the thermostatic element are those prevailing in the water to be heated. As the water cools, the motion of the various parts described will be such that the disk valve 38 moves toward a closed position and the restricting tapered pin 35 opens the port 34 further. As a consequence of such motion the pressure in pipe 30 rises and the pressure in chamber 28 increases. This in turn opens the pilot valve 16 further, whereby the pressure in the chamber 11 rises and the valve 9 is opened to a greater extent. The heating fluid from inlet 6 is thereupon able to pass through port 7 without being throttled down quite as far as before. More steam and steam at a higher pressure therefore enters the coil 3 and the temperature of the water 2 begins to rise. When the temperature of the water in tank 1 rises the opposite effect is obtained. The thermostatic element will act to cause the member 48 to move downward whereby the disk valve 38 moves toward the left enabling the spring 42 to move the restricting tapered pin 35 toward the left. The result of these movements is to lower the pressure in the outlet pipe 30 of the operating fluid. This pressure drop occurs very promptly as mentioned above, as not only the outlet is made freer, but also the inlet is restricted more. The result of this pressure drop in pipe 30 and chamber 28 is that the valve 9 closes further.

The principal feature of my invention will now readily be understood. It is that for every point in the temperature range of the water in tank 1 there is a definite corresponding pressure in pipe 4. This is obtained by the functioning of diaphragm 23. When pressure rises to a certain point in chamber 28 the valve 9 opens as explained above. It will continue to open until the pressure in pipe 4 and chamber 19 under diaphragm 23 has increased sufficiently to balance the pressure in chamber 28 acting on diaphragm 27. The slightest change in the pressure in chamber 28 will result in a change in pressure in pipe 4, inversely proportionate to the areas of the diaphragms 27 and 23.

Further, as long as the pressure in chamber 28 remains constant the pressure in pipe 4 will be maintained uniform. Any change in pressure in pipe 4 and chamber 19 will disturb the equilibrium between it and the pressure in chamber 28, which through the above explained action of pilot valve 16 will readjust the position of valve 9 so as to restore balance. This will eliminate the effect of pressure variations in supply pipe 6 on regulation. It also enables the regulating valve to, particularly in connection with large tanks, so to say, anticipate a drop in temperature. For instance, a sudden inrush of cold water at the bottom of the heater would through more rapid condensation cause a pressure drop in coil 3 and pipe 4, and the valve would open and increase the supply of heating fluid even before the change in the temperature of the water had reached and affected the thermostat. The forces giving the valve 9 its position are principally the pressures on the two diaphragms, the force of spring 29 being substantially negligible as compared with these pressures.

The action of the valve 9 is in general just as it always is as far as the relation to the pressure in pipe 4 is concerned. This pressure in pipe 4 will be retained constant irrespective of the pressure in pipe 6. If the pressure in pipe 4 should vary, the position of the pilot valve 16 would at once be changed by the variations of the pressure on the under side of the diaphragm 23 and thus the proper pressure in pipe 4 would be restored. In this respect therefore the valve works in the ordinary manner of pressure reducing valves. The effect of the upper diaphragm 27 and the thermostatic control is to determine what the constant pressure in pipe 4 is to be. Any change in the pressure on the diaphragm raises or lowers the definite point to which the pressure of the heating fluid is reduced. As the temperature of the water to be heated changes therefore, the pressure of the steam delivered to the heating element varies, becoming lower as the temperature rises. Thus, for every temperature of the water there will be a corresponding pressure in pipe 4 which will be held constant irrespective of the initial pressure in pipe 6. From the above explanation it can readily be seen that while the regulating valve is very sensitive, responding to variations of a fraction of a degree F., at the same time it is stable and will adjust itself to any intermediate opening corresponding to the load at hand.

While I have in the above described the action of that portion of the apparatus including the disk valve 38 and the tapered restriction pin 35 together with the passages controlled by them and the operating fluid passed through them in connection with a thermostat and in connection further with a device for heating water or other fluid, I wish it understood that this portion of the apparatus has application quite apart from this relation. There are many devices in which some action is effected either directly or indirectly by some pressure fluid either in response to temperature variations or variations in some other quality such as humidity, pressure, etc., and this portion of my invention may be employed in connection with them to great advantage, as far as promptness of regulation is concerned.

It is possible, on the other hand, to utilize a pressure reduction valve similar to that of Fig. 2 for the purpose described without using that part of the apparatus shown in Figs. 3 and 4. A variation for this purpose is shown in Fig. 5.

Here, 1a is the wall of a vessel or chamber containing the water or other fluid to be heated. Steam for the purpose of heating it is admitted by the pressure reducing valve 5a, the steam entering by the pipe 6a and leaving by the pipe 4a. The coils or heating element to which the pipe 6a is connected are not illustrated in this figure.

The lower portion of the pressure reducing valve 5a is similar in every respect to the valve shown in Fig. 2. The plunger 25a, however, bearing on the upper side of the diaphragm 23a and urged toward it by the spring 29a is influenced not by pressure in a chamber like 28 of Fig. 2 but by a lever 60. This lever is pivoted at 61, its one end 62 engaging the plunger 25a to urge it in opposition to the spring 29a. The opposite end 63 of the lever is acted upon by a pin 64 which receives its motion from the fluid in the thermostatic element which is subjected to the temperature of the water or fluid to be controlled. The portion exposed to this fluid is designated by the reference numeral 65, the reference numeral 66 showing the pipe connecting the elements 65 to the chamber 67. The corrugated diaphragm 68 closing the outer end of the pressure containing conduit permits pin 64 which is secured to the flat portion 69 of the diaphragm to move in response to temperature changes in the fluid in the usual manner. It will be understood that this thermostatic element is of usual commercial form.

The action of this apparatus, for instance in connection with a hot water tank, will be obvious. As the temperature of the water in the container 1a rises, the liquid at the element 65, pipe 66 and in the space between the shell 67 and the corrugated diaphragm 68 expands causing pin 64 to move downward. This results in an upward motion of the end 62 and a compression of the spring 29a, the result being a closing movement of the pilot valve 16 and resultant closing motion of the main valve 9. Conversely a lowering of the temperature of the water in the container results in a contraction of the fluid in the thermostatic element, an upward motion of the pin 64 and a final opening movement of the valve 9. This form of the device, therefore, like the one described provides a positive and definite pressure in pipe 4a for any temperature within the desired range of the water in the container 1a.

It will be obvious that variations in the invention may be made without losing its spirit. As illustration of such a variation, the piston 10 of the reducing valve might be replaced by a diaphragm. The claims are to be read as covering this and similar modifications.

I claim:

1. In apparatus of the class described, a control element comprising in combination a pair of chambers communicating through a port, a tapered restriction pin reciprocably movable within the port, an inlet to the first and an outlet from the second of said chambers by means of which fluid under pressure can be supplied to and carried away from the two chambers respectively, a further outlet port from said second chamber opening to waste, and a valve controlling said last-named port creating variations in pressure in said second chamber, said valve and pin being so arranged that any movement of the former will affect the position of the latter to accelerate the change of pressure in the chamber.

2. In apparatus of the class described, a control element comprising in combination a pair of chambers communicating through a port, a tapered restriction pin reciprocably movable within the port, an inlet to the first and an outlet from the second of said chambers by means of which fluid under pressure can be supplied to and carried away from the two chambers respectively, a further outlet port from said second chamber opening to waste, a valve controlling said last-named port creating variations in pressure in said second chamber, said valve and pin being so arranged that any movement of the former will affect the position of the latter to accelerate the change of pressure in the chamber, resilient means tending to hold the tapered pin in the position where the maximum restriction of the port between the first and second chambers is obtained and to open the valve controlling the discharge from the second chamber to waste, and means responsive to variations in that which is to be controlled actuating the valve and pin in the opposite direction.

3. In apparatus of the class described, a control element in accordance with claim 2, the last-named means comprising a lever one point of which actuates said discharge control valve and a second point of which is acted on by a member moving in response to variations in that which is to be controlled.

4. In apparatus of the class described, a control element in accordance with claim 2, the last-named means comprising a thermostat one part of which moves in response to and in proportion to temperature variations of something whose temperature is to be controlled and a lever to transmit such motion to said valves while multiplying it.

5. In apparatus of the class described, the combination of a container for water to be heated, a heating element adapted and arranged to carry steam in heat-transferring relation to said water, a pipe to supply steam to said element, a pressure reducing valve in said pipe to control the pressure at which the steam is supplied to the element and having a pilot valve whose position determines said pressure, said pressure reducing valve further having a diaphragm and means to resiliently urge the pilot valve against one side of the diaphragm, a plunger engaging the opposite side of the diaphragm, means to force it resiliently against the diaphragm, a thermostatic element comprising a part moving in response to temperature changes in the water in the container, and means to cause motion of said part to be communicated to said plunger.

6. In apparatus of the class described, the combination of a container for a liquid to be heated, a heating element adapted to carry a condensable heating medium in heat transferring relation with the liquid, a pipe to supply said condensable heating medium to said element, a pressure reducing valve controlling the flow through said pipe and adapted to reduce the pressure from a variable higher pressure to an adjustable lower pressure, said pressure reducing valve comprising a piston-operated main valve controlling the flow of heating medium, a pilot valve admitting operating pressure fluid to the piston, a diaphragm the pressure on which influences the extent of opening of the pilot valve, and thermostatically operated means varying the pressure on said diaphragm responsively to the temperature of the liquid to be heated.

7. In apparatus of the class described, the combination of a container for a liquid to be heated, a heating element adapted to carry a condensable heating medium in heat transferring relation with the liquid, a pipe to supply said condensable heating medium to said element, a pressure reducing valve controlling the flow through said pipe and adapted to reduce the pressure from a variable higher pressure to an adjustable lower pressure, said pressure reducing valve comprising a piston-operated main valve controlling the flow of the heating medium, a pilot valve to admit high pressure heating medium to the piston, a pair of diaphragms, rigid means extending between them to transmit motion from one to the other, the side of the first diaphragm opposite the rigid means being subject to pressure from the outlet side of the piston-operated valve and engaging the pilot valve so as to open it by movement toward it, the side of the second diaphragm away from the rigid means being subject to fluid pressure varying with the temperature of the fluid to be heated, and a spring opposing motion of the two diaphragms in a direction to open the pilot valve, whereby the position of the pilot valve and consequently the position of the piston-operated valve and the pressure of the medium leaving the pressure reducing valve is responsive to the temperature of the fluid to be heated.

8. In apparatus of the class described, the combination of a container for a liquid to be heated, a heating element adapted to carry a condensable heating medium in heat transferring relation with the liquid, a pipe to supply said condensable heating medium to said element, a pressure reducing valve controlling the flow through said pipe and adapted to reduce the pressure from a variable higher pressure to an adjustable lower pressure, said pressure reducing valve comprising a main valve controlling the flow of heating medium, pressure fluid actuated means for operating said main valve, a pilot valve admitting pressure fluid to said means, a diaphragm the pressure on which influences the extent of opening of the pilot valve, and thermostatically operated means varying the pressure on said diaphragm responsively to the temperature of the liquid to be heated.

STEN E. B. SODERBERG.